(12) United States Patent
Le Mouel

(10) Patent No.: US 12,277,091 B2
(45) Date of Patent: Apr. 15, 2025

(54) DOCUMENT BASED MONITORING

(71) Applicant: Oracle International Corporation, Redwood Shores, CA (US)

(72) Inventor: Philippe Maurice Le Mouel, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/223,282

(22) Filed: Jul. 18, 2023

(65) Prior Publication Data

US 2024/0037071 A1 Feb. 1, 2024

Related U.S. Application Data

(60) Provisional application No. 63/392,803, filed on Jul. 27, 2022.

(51) Int. Cl.
*G06F 16/17* (2019.01)
*G06F 16/185* (2019.01)

(52) U.S. Cl.
CPC ........ *G06F 16/1734* (2019.01); *G06F 16/185* (2019.01)

(58) Field of Classification Search
CPC .......................... G06F 16/1734; G06F 16/185
USPC ........................................................ 707/687
See application file for complete search history.

(56) References Cited

U.S. PATENT DOCUMENTS

| 8,694,516 | B2 | 4/2014 | Cheng |
| 9,166,989 | B2 | 10/2015 | Huang et al. |
| 10,587,671 | B2 | 3/2020 | Verma et al. |
| 2008/0294670 | A1 | 11/2008 | Borissov et al. |
| 2013/0185643 | A1* | 7/2013 | Greifeneder .......... H04L 67/535 |
| | | | 715/736 |
| 2015/0039625 | A1 | 2/2015 | Nisbet et al. |

(Continued)

OTHER PUBLICATIONS

"Amazon CloudWatch Logs", Amazon CloudWatch Logs User Guide Features, Available online at: https://docs.aws.amazon.com/pdfs/AmazonCloudWatch/latest/logs/cwl-ug.pdf#WhatIsCloudWatchLogs, Accessed online on Jun. 15, 2023, 40 pages.

(Continued)

*Primary Examiner* — Hicham Skhoun
(74) *Attorney, Agent, or Firm* — Kilpatrick Townsend & Stockton LLP

(57) ABSTRACT

Techniques may include receiving an asynchronous event message at an inbound adapter of a document-based monitoring system. In addition, the techniques may include accessing a document containing a hierarchical log of event entries. The techniques may include adding an event entry to the hierarchical log based at least in part on the asynchronous event message, and where the event entry may include information identifying the asynchronous event message. Moreover, the techniques may include identifying a corrupted event entry in the hierarchical log. Also, the techniques may include comparing the timestamp fields of the event entries in the hierarchical log to the timestamp field of the corrupted event entry. The techniques may include determining a parent entry of the corrupted event entry based at least in part on the comparison. In addition, the techniques may include updating the parent ID field of the corrupted event entry to identify the parent entry.

20 Claims, 12 Drawing Sheets

(56) References Cited

U.S. PATENT DOCUMENTS

| | | | | |
|---|---|---|---|---|
| 2015/0127619 A1* | 5/2015 | Jarvis | ................. | G06F 16/2246 |
| | | | | 707/685 |
| 2015/0213454 A1* | 7/2015 | Vedula | ................. | G06Q 30/016 |
| | | | | 705/304 |
| 2018/0365092 A1* | 12/2018 | Linetskiy | .............. | G06F 11/079 |
| 2019/0332481 A1* | 10/2019 | Kulick | ................. | G06F 11/076 |
| 2021/0373982 A1* | 12/2021 | Neilson | .............. | G06F 12/0833 |
| 2023/0176790 A1* | 6/2023 | Dhuse | ................. | G06F 11/3072 |
| | | | | 707/956 |
| 2023/0325360 A1* | 10/2023 | Wijayaratne | ........ | H04L 67/1095 |
| | | | | 707/625 |

OTHER PUBLICATIONS

"Azure Monitor", Available online at: https://azure.microsoft.com/en-in/products/monitor/#overview, Accessed online on Jun. 15, 2023, 5 pages.

"Azure Monitor Logs Overview", Available online at: https://learn.microsoft.com/en-in/azure/azure-monitor/logs/data-platform-logs, Feb. 11, 2022, 4 pages.

"Azure Storage Analytics Logging", Available online at: https://learn.microsoft.com/en-us/azure/storage/common/storage-analytics-logging, Apr. 15, 2022, 7 pages.

"Cloud Logging Documentation", Available online at: https://cloud.google.com/logging/docs/, Jan. 15, 2015, 5 pages.

"Detecting and Responding to Cloud Logging Events in Real-time", Available online at: https://cloud.google.com/blog/products/management-tools/automate-your-response-to-a-cloud-logging-event, Jun. 25, 2020, 10 pages.

"Log Data Formats", Available online at: https://www.dynatrace.com/support/help/observe-and-explore/logs/log-monitoring/log-monitoring-configuration/log-data-format, Apr. 6, 2018, 7 pages.

"Log Monitoring", Available Online at https://www.dynatrace.com/support/help/how-to-use-dynatrace/log-monitoring/analyze-log-data/log-viewer, 2022, 5 pages.

"Log Processing", Available online at: https://www.dynatrace.com/support/help/observe-and-explore/logs/log-monitoring/log-processing, 2022, 4 pages.

"Log Viewer", Available online at: https://www.dynatrace.com/support/help/observe-and-explore/logs/log-monitoring/analyze-log-data/log-viewer, 2022, 5 pages.

"Logging and Viewing Logs", Available online at: https://cloud.google.com/run/docs/logging, Oct. 26, 2022, 7 pages.

"Monitor Kubernetes/Openshift Events", Available online at: https://www.dynatrace.com/support/help/platform-modules/infrastructure-monitoring/container-platform-monitoring/kubernetes-monitoring/monitor-events-kubernetes, 2022, 4 pages.

Sapegin et al., "Hierarchical Object Log Format for Normalisation of Security Events", 9th International Conference on Information Assurance and Security (IAS 2013, IEEE), Dec. 2013, 6 pages.

* cited by examiner

| 761 Instances | | | | |
|---|---|---|---|---|
| Primary Identifier $\smash{\underset{335}{\int}}$ | Instance Id $\smash{\underset{315}{\int}}$ | Status $\smash{\underset{320}{\int}}$ | Business Identifiers $\smash{\underset{340}{\int}}$ | Duration $\smash{\underset{325}{\int}}$ |
| $\smash{\underset{305}{\int}}$ runner_012345 IssueFaultXpathFunc...\|1.0.0 | StIKYgOMEe2A_RgptGAEg | Succeeded | | Received Today at 08:47 AmPDT<br>Succeeded Today at 08:47 AmPDT<br>Duration 16 seconds |
| fbFileTogetMy_New10MB.csv<br>FileRead10MB\|1.0.0 | I8F8DwL7Ee2W2e_HHdqTq | Aborted | | Received Yesterday at 03:31 PM PDT<br>Succeeded Yesterday at 03:32 PM PDT<br>Duration 35 seconds |
| fbFileTogetMy_New10MB.csv<br>FileRead10MB\|1.0.0 | LXATxwL7Ee2WWe_HHdqTg | Succeeded | | Received Yesterday at 03:28 PM PDT<br>Succeeded Yesterday at 03:31 PM PDT<br>Duration 2min 57 seconds |
| fbFileTogetMy_New10MB.csv<br>FileRead10MB\|1.0.0 | V3OqwL6E2W2e_HHdqTg | Succeeded | | Received Yesterday at 03:22 PM PDT<br>Succeeded Yesterday at 03:28 PM PDT<br>Duration 2min 58 seconds |
| fbFileTogetMy_New10MB.csv<br>FileRead10MB\|1.0.0 | gpaMhwL5Ee2W2e_HHdqTg | Succeeded | | Received Yesterday at 03:16 PM PDT<br>Succeeded Yesterday at 03:22 PM PDT<br>Duration 2min 59 seconds |
| fbFileTogetMy_New10MB.csv<br>FileRead10MB\|1.0.0 | FA_ewL5EeW2e_HHdqTg | Succeeded | | Received Yesterday at 03:13 PM PDT<br>Succeeded Yesterday at 03:16 PM PDT<br>Duration 3min |
| fbFileTogetMy_New10MB.csv<br>FileRead10MB\|1.0.0 | qZrXqwL4Ee2W2e_HHdqTq | Succeeded | | Received Yesterday at 03:10 PM PDT<br>Succeeded Yesterday at 03:13 PM PDT<br>Duration 2min 56 seconds |

FIG. 3

Instances

Time Window Last 32 days x     Jul 14, 2022, 02:40:49 PM PDT

761 Instances

| Primary Identifier | Instance Id | Status | Business Identifiers | Duration |
|---|---|---|---|---|
| number: 012345 IssueFaultXpathFunc...1.0.0 | StKYg... 405 | Succeeded | Received Today at 08:47 AM PDT<br>Succeeded Today at 08:47 AM PDT<br>Duration 16 seconds | |
| ftpFileToget My_New_10MB.csv<br>FileReadl0MB1 1.0.0 | 18F8D... | Aborted | Received Yesterday at 03:31 PM<br>Aborted Yesterday at 03:32 PM<br>Duration 35 seconds | |
| ftpFileToget My_New_10MB.csv<br>FileReadl0MB1 1.0.0 | LXATx... | Succeeded | Received Yesterday at 03:28 PM<br>Succeeded Yesterday at 03:31 PM<br>Duration 2 min 57 seconds | |
| ftpFileToget My_New_10MB.csv<br>FileReadl0MB1 1.0.0 | v30gj... | Succeeded | Received Yesterday at 03:22 PM<br>Succeeded Yesterday at 03:28 PM<br>Duration 2 min 58 seconds | |
| ftpFileToget My_New_10MB.csv<br>FileReadl0MB1 1.0.0 | gbaMh... | Succeeded | Received Yesterday at 03:16 PM<br>Succeeded Yesterday at 03:22 PM<br>Duration 2 min 59 seconds | |
| ftpFileToget My_New_10MB.csv<br>FileReadl0MB1 1.0.0 | FA_e... | Succeeded | Received Yesterday at 03:13 PM<br>Succeeded Yesterday at 03:16 PM<br>Duration 3 min | |
| ftpFileToget My_New_10MB.csv<br>FileReadl0MB1 1.0.0 | qZhXd... | Succeeded | Received Yesterday at 03:10 PM<br>Succeeded Yesterday at 03:13 PM<br>Duration 2 min 56 seconds | |
| ftpFileToget My_New_10MB.csv<br>FileReadl0MB1 1.0.0 | 1gQxl... | Succeeded | Received Yesterday at 03:04 PM<br>Succeeded Yesterday at 03:10 PM<br>Duration 2 min 58 seconds | |

Activity Stream — 410
Instance Id: StKYgOMEe2A_RtgdrGAEg

Tracing level: Debug

- 08:47:42:107 AM, 89ms   Thu Jul 14 08:47:40:180 AM PDT 2022 Is 927ms
  Wire Message received by Trigger trigger SOAP
  Message started processing
- 08:47:42:196 AM
  Message received by Assignment InitFaultVars
- 08:47:42:241 AM, 32ms
  Message entered Scope scopeforBusinessFault
- 08:47:42:273 AM, 33ms
  Message received by Data Mapper
- 08:47:42:306 AM, 5ms
  Data Mapping completed with Message
- 08:47:42:311 AM, 8,215ms
  Message received by Invoke invokeLocalSOAPWS
- 08:47:50:526 AM, 5s 6ms — 315
  Wire Message sent to Invoke invokeLocalSOAPWS — 420
- 08:47:55:532 AM, 306ms
  Error processing message in Invoke invokeLocalSOAPWS
  Summary Details Payload — 425
  ja:exontws\WebServiceException:ja:exontsoap:SOAPException:ja:exontsoap:SOAPException:Badresponse:502 notreadabletomurl
  http://soap-adapter:8080/flows/integration/flows/soap/LOCAL_SYNCWEBSERVICEW1.0/ — 430
- 08:47:55:838 AM, 18ms
  Fault Handler — Message entered Fault Handler of scopeforBusinessFault
- 08:47:55:856 AM
  Fault Handler — Message received by Assignment updated FaultVars 08:47:55:838 AM, 18ms

*FIG. 4*

| Time Window Last 32 days x | Status Active | Sort By Last Update | Clear | | | | | |
|---|---|---|---|---|---|---|---|---|
| 86 Integrations | | | | | | | | |
| Name | | | Received | Processed | Succeeded | Errored | Aborted | Last Scheduled By |
| IssueFaultXpathFunctionForBusinessFault (1.0)<br>Last Message: Today at 08:47 AM PDT | | | 8 | 8 | 8 | 0 | 0 | |
| FileRead10MB (1.)<br>Last Message: Yesterday at 03:32 PM PDT | | | 607 | 607 | 574 | 11 | 22 | icsadmin |
| FileReadShort (1.0)<br>Last Message: Sunday at 07:22 PM PDT | | | 59 | 58 | 40 | 0 | 18 | |
| Local_SyncWebServiceWithFaultName (1.0)<br>Last Message: Jul 1st, 2022 04:13 PM PDT | | | 5 | 5 | 5 | 0 | 0 | |
| RateLmt_JavaScript_Max15Sec (1.0)<br>Last Message: Jul 1st, 2022 01:53 PM PDT | | | 9 | 9 | 4 | 5 | 0 | |
| FileReadShort_clone_ambar (1.0)<br>Last Message: Jul 1st, 2022 04:16 AM PDT | | | 9 | 9 | 9 | 0 | 0 | |
| RuntimeSyncOver120secsXSLTTrans (1.0)<br>Last Message: Jun 30th, 2022 03:39 PM PDT | | | 4 | 4 | 0 | 4 | 0 | |
| SO_TRIVIAL_2WAIT (1.0)<br>Last Message: Jun 29th, 2022 11:35 AM PDT | | | 5 | 5 | 3 | 2 | 0 | |
| FTPSTAGEREADSEGMENTSTRAILER (1.0)<br>Last Message: Jun 21st, 2022 04:01 PM PDT | | | 1 | 1 | 1 | 0 | 0 | |
| asyncFlow(1.0)<br>Last Message: Jun 17th, 2022 04:13 PM PDT | | | 26 | 19 | 18 | 0 | 1 | |

FIG. 5

DOCUMENT BASED MONITORING

CROSS-REFERENCE TO RELATED APPLICATIONS

The present application is a non-provisional of and claims the benefit and priority under U.S.C. 119(e) of U.S. Provisional Application No. 63/392,803, filed Jul. 27, 2022, entitled "DOCUMENT BASED MONITORING," the entire contents of which is herein incorporated by reference for all purposes.

BACKGROUND

Monitoring processes in a cloud-based system can be complex with monitoring data spread over several database systems. Some of these systems can log events related to the process and other systems can monitor the processes' state. These systems can have a complex lifecycle and the databases can be prone to contention errors where multiple entities attempt to update a database entry simultaneously. Accordingly, improvements to monitoring techniques are desirable.

BRIEF SUMMARY

In one general aspect, techniques may include receiving an asynchronous event message at an inbound adapter of a document-based monitoring system, where the inbound adapter is configured to receive asynchronous event messages. Techniques may also include accessing a document containing a hierarchical log of event entries, where the document is stored in a tracking repository of the document-based monitoring system. Techniques may furthermore include adding an event entry to the hierarchical log in the tracking repository based at least in part on the asynchronous event message, and where the event entry may include information identifying the asynchronous event message, where the information includes at least one of an unique identifier (ID) field identifying the asynchronous event message, a process identifier identifying the process that caused the asynchronous event message to be generated, a timestamp field having an execution time for the event that generated the event message, or a parent ID field identifying a parent event entry. Techniques may in addition include identifying a corrupted event entry in the hierarchical log. Techniques may moreover include comparing the timestamp fields of the event entries in the hierarchical log to the timestamp field of the corrupted event entry. Techniques may also include determining a parent entry of the corrupted event entry based at least in part on the comparison, where the parent event entry immediately precedes the corrupted event entry. Techniques may furthermore include updating the parent ID field of the corrupted event entry to identify the parent entry of the corrupted event entry. Other embodiments of this aspect include corresponding computer systems, apparatus, and computer programs recorded on one or more computer storage devices, each configured to perform the actions of the techniques.

Implementations may include one or more of the following features. Techniques where the parent event entry for the corrupted event entry cannot be identified with the parent ID field of the corrupted event entry. Techniques where accessing the document further may include creating the document. Techniques where the entry contains a state field showing a state of the process. Techniques may include: updating the state field based on a change in the state of the process. Techniques may include: querying the hierarchical log. Techniques where the techniques further may include: aggregating the hierarchical log with one or more additional hierarchical logs. Implementations of the described techniques may include hardware, a method or process, a computer tangible medium, a computer readable medium, or a system.

BRIEF DESCRIPTION OF THE DRAWINGS

FIG. 3 shows an example user interface (UI) showing the result of a search according to an embodiment.

FIG. 4 shows an example user interface (UI) showing the result of a search according to an embodiment.

FIG. 5 shows an example user interface (UI) 500 showing the result of a search according to an embodiment.

DETAILED DESCRIPTION

Figure 1:
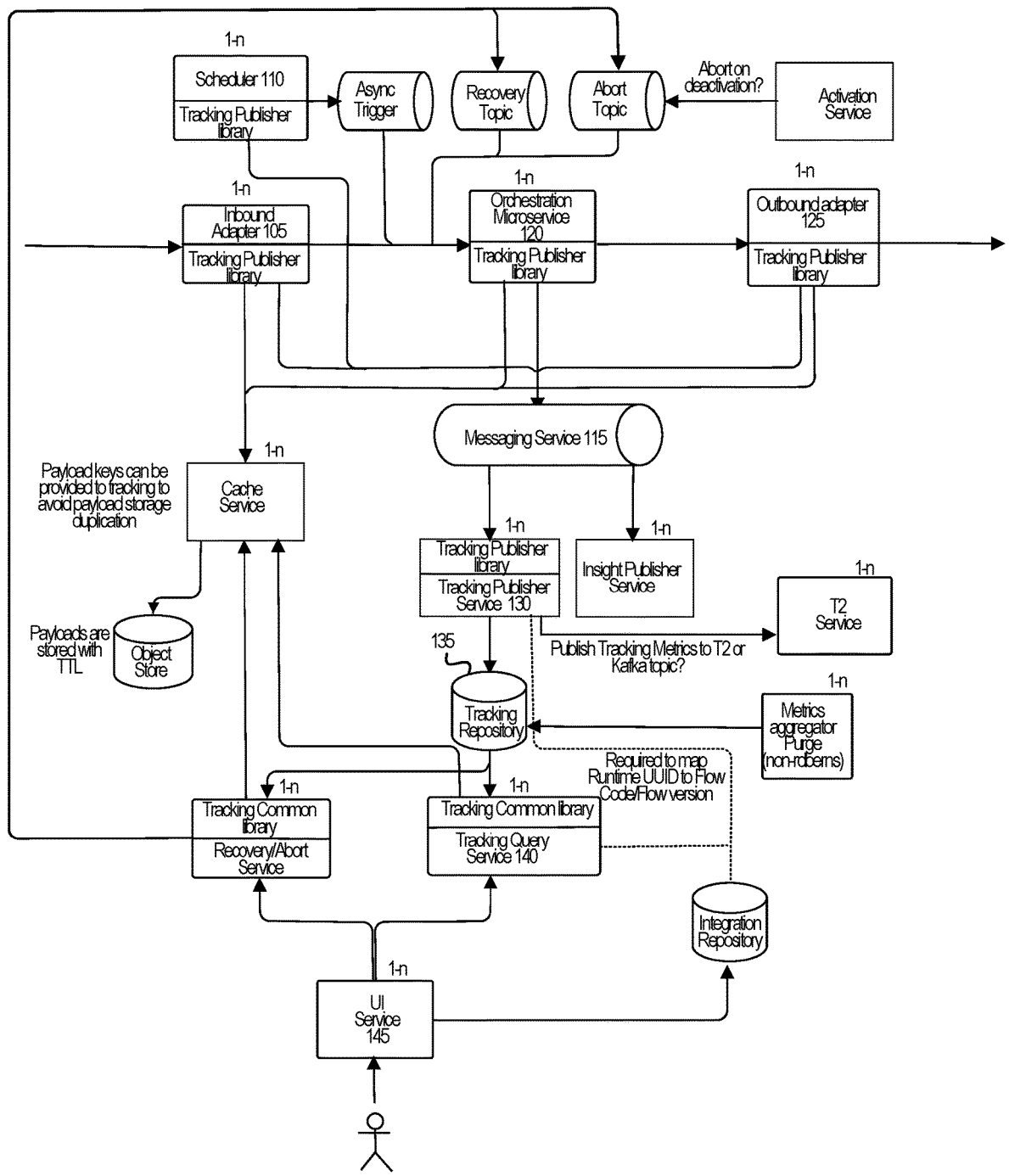
FIG. 1 shows a high-level component architecture for implementing document based monitoring according to an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Certain processes can be tracked with both logging (e.g., to record events related to the process), and state tracking (e.g., to record the processes' state). Logging can mean recording an ordered list of events related to a process, and state tracking can mean recording, and updating, the process' state during its lifecycle. Processes can be executed in parallel with multiple sub-processes in the process executing simultaneously. Parallel executions can lead to contention-based performance issues, where two or more sub-processes attempt to simultaneously update a log or state.

Logging and state tracking may be performed with a text document that tracks both state and logging information. Storing the logging and state tracking information in a single document can reduce contention-based performance issues. The first event executed as part of a process can receive a unique process identifier (ID) from a document-based monitoring system. The process ID can be reused by subsequent events that are executed as part of the process and this ID can be used to track process information. The events associated with the process ID are aggregated by the document-based monitoring system and inserted in a document that is used to track the process.

The document can have multiple sections with an event section that contains event entries for events associated with the process. The event's properties, such as the customer identifier (ID) or the event state, can be recorded in the event entry. The event state can be documented in a state field in the event entry. An execution time section can record the execution time for the process, and a properties section can record the processes properties. The process' properties can include a process state, a process ID, and an error field identifying any active errors. The sections in the document can be updated as new events are received by the document-based monitoring system.

Event entries in the event section can be arranged hierarchically based on a parent child relationship between entries. A first event entry can be assigned a process ID and an event ID. Subsequent event entries can be assigned the same process ID, to identify the process, and a separate event ID to identify the subsequent event. The event entry for the subsequent event can also contain a parent event field that can contain the event ID for an event that preceded the subsequent event. In addition, the event entries can contain a time field recording the time the event was executed. If the hierarchical arrangement of event entries is corrupted, the time field entries can be used to reconstruct the hierarchy. For example, the entries can be placed in chronological order using the time field entries.

In an illustrative example, first event for a process is received at a document-based monitoring system. The system creates a document for the process and creates an entry in the document for the event. The entry includes a process ID that identifies the process and an event ID for the event. The entry also includes a time field recording when the event was created (e.g., the time when a message identifying the event was received at the system).

A second event for the process is received at the document-based monitoring system. A second entry is made in the tracking document for the process. This second entry records information about the second event including a second event ID, the process ID, and a time field for the second event. In this way, events are added to the tracking document until the process concludes.

FIG. 1 shows a high-level component architecture 100 for implementing a document-based monitoring system according to an embodiment. An event message identifying an event can be pushed to the architecture 100 by a process and received at the inbound adapter 105. An adapter, such as a single object access point (SOAP) adapter, can be used as the inbound adapter 105 to receive asynchronous event messages from the process as the events occur. Event messages may be requested according to a schedule by a scheduler 110 in the architecture 100. The schedule can be used to request event messages at regular intervals (e.g., once daily). For example, a process can send an event message with a day's events and the events in the message can be processed in a batch.

Event message can be received at the inbound adapter 105 or the scheduler 110. The message can contain a unique process identifier (ID) associated with a process (e.g., an alphanumeric ID for a process). The received event message can be sent to a messaging service 115 (e.g., Apache Kafka). The process ID for the process can be provided to the orchestration microservice 120 (e.g., mCube) that can aggregate data about the process from one or more sources such as databases in architecture 100. The orchestration microservice 120 can publish tracking events (e.g., information about the microservice's progress) to the messaging service 115. Requests for information from outside the architecture 100 can be made by the outbound adapter 125, and the adapter's tracking events can be provided to messaging service 115. Information from outside the architecture could include payment approval from a bank.

The messages and events in the messaging service 115 can be sent to the tracking publisher service 130. The tracking publisher service 130 can be a microservice that is responsible for consuming tracking events from the messaging service 115. Some of the consumed events can be merged in memory by the tracking publisher service 130 and one or more tracking documents can be created by the tracking publisher service 130. The events can be merged through the use of batch processing or Kafka streams. A tracking document can be a text file, such as a JSON file, that contains a log of events from one or more of the inbound adapter 105, the scheduler 110, the orchestration microservice 120, or the outbound adapter 125. For example, the events can be events from event messages or tracking events. Events can have a unique event identifier (ID) and the events can be linked in a hierarchy of events where a parent event is identified by the parent's event ID in a child event's record.

The tracking documents can be sent from the tracking publisher service 130 to a tracking repository 135. Tracking documents can be archived in the tracking publisher service 130 which can be implemented using a search and analytics suite such as OpenSearch or Elasticsearch. Searches of the archived searches can be performed by the tracking query service 140 in response to requests received via the user interface (UI) service 145. Searches can include queries requesting events related to one or more customer identifiers (IDs) or time bounded queries (e.g., a search for all events in a 72-hour period). The tracking query service 140 can aggregate data from one or more tracking documents archived in the tracking repository 135.

Figure 2:
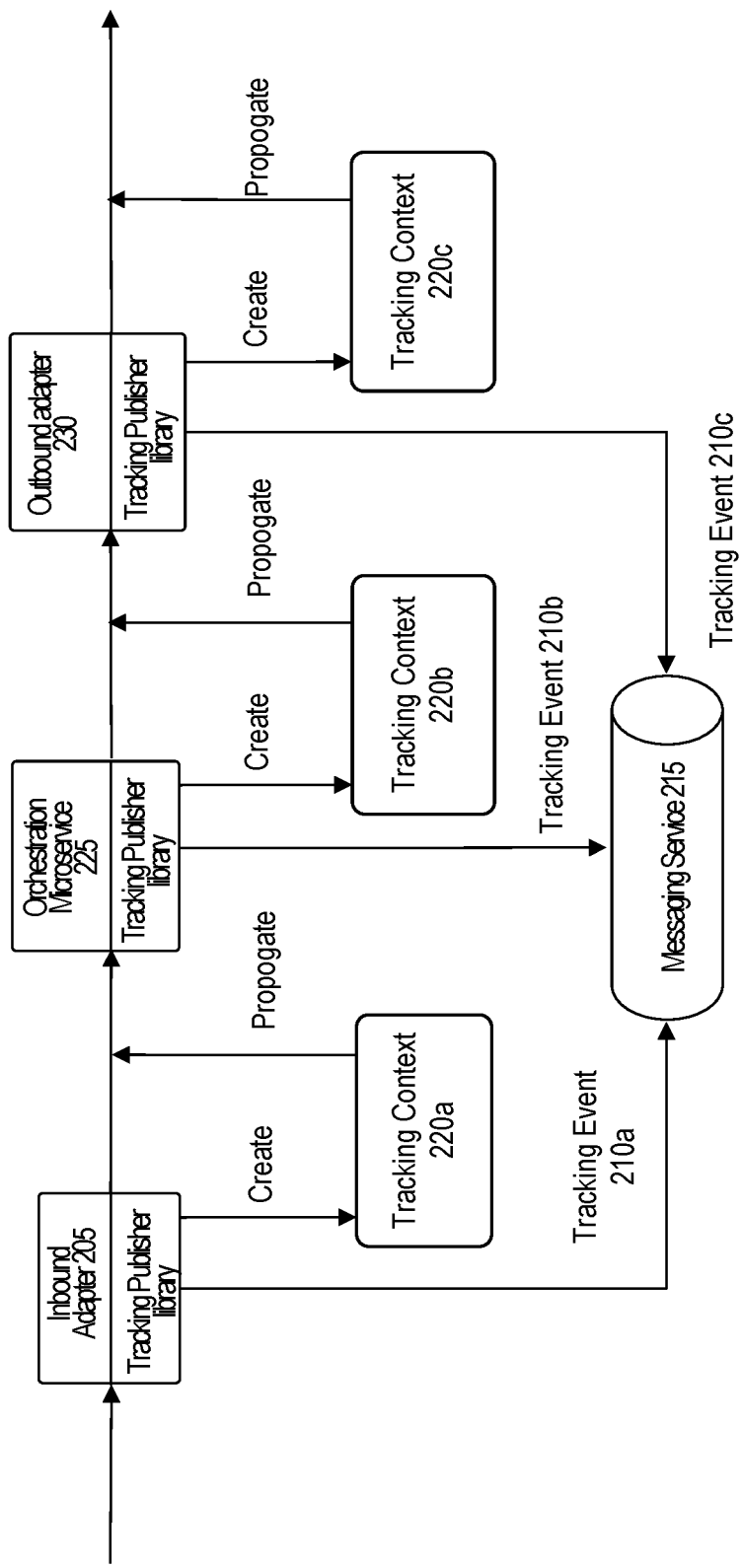
FIG. 2 is a simplified diagram showing tracking context propagation according to an embodiment.

FIG. 2 is a simplified diagram 200 showing tracking context propagation according to an embodiment. Tracking context can comprise the information that the document-based monitoring system uses to perform, and record, tracking functionality, and tracking context propagation can be the process of providing the tracking context to the appropriate components within the system.

An event message received at the inbound adapter 205 can be assigned a unique process identifier by the adapter. The unique process identifier (e.g., process ID) can be associated with the process that generated the event (e.g., the process that caused the event message to be sent). The event message can be generated by a process, and the process can be the first process in a series of processes. In this case, there may not be a parent process with a parent process identifier in the embodiment shown in diagram 200. If there is a parent process, the event message may identify a parent process using a unique process identifier for the parent process. The inbound adapter 205 can also record the time when the message was received.

The inbound adapter 205 can publish a tracking event 210a to the messaging service 215 and this event can be added to the tracking document for the process that generated the event. Tracking event 210a can be published with a tracking event identifier (e.g., event ID) that is a unique identifier for the event. However, tracking event 210a may be the first event in a tracking document and the event may not have a parent event identifier. If the document is the first event for a process, the messaging service 215 may create a tracking document in response to receiving the published event.

The process that generated the event message that was received at inbound adapter 205 may be part of a series of processes (e.g., a chain of parent and child processes). The current process (e.g., the process that generated the event message) can have a parent process and the tracking event 210a can have a parent event. In such circumstances, the tracking event 210a can be published with the unique process identifier, an event identifier, a parent process identifier, and a parent event identifier.

The inbound adapter 205 can propagate the tracking context 220a for tracking event 210a to the orchestration microservice 225. The tracking context 220a can include the unique process identifier and the time when the event message was received. The tracking context 220a can also include a tracking event identifier associated with tracking event 210a. Tracking event 210a can be the parent event for a subsequent event and the tracking event identifier can be the parent identifier for any subsequent event.

Orchestration microservice 225 can publish a tracking event 210b to the messaging service 215 and the event can be recorded in the document (e.g., tracking document). The tracking event 210b can be published with an event identifier for tracking event 210b and a parent identifier for the event that preceded tracking event 210b. In this case, tracking event 210a is the parent event for tracking event 210b and the event identifier for 210a can be included in tracking event 210b as the parent identifier. The event identifier for 210a can be received at orchestration microservice 225 as part of the tracking context 220a.

The orchestration microservice 225 can publish tracking context 220b to the outbound adapter 230. Tracking context 920b can include the unique process identifier, the time when the message was received at inbound adapter 205 and the event identifier for 210b. Upon receiving the tracking context 220b, the orchestration microservice 225 can publish tracking event 210c to the messaging service 215. Tracking event 210c can include an event identifier for 210c, the parent event identifier for tracking event 210c (e.g., the event identifier for 210b), and the unique process identifier.

Outbound adapter 230 can propagate tracking context 220c in response to publishing tracking event 210c. The tracking context can include the unique process identifier, the event identifier for 210c, and the time when the message was received at inbound adapter 205. Publishing tracking event 210c can be the end of the current process, and tracking context 220c can be used to provide information to a child process following the current process. While three events are published in diagram 200, a larger number of events or a smaller number of events can be published as part of a process.

FIG. 3 shows an example user interface (UI) 300 showing the result of a search according to an embodiment. The UI 300 can be part of the UI service 145 and the search can be a search of documents in the tracking repository 135 that was performed by the tracking query service 140. The tracking query service 140 can be an application programming interface (API), such as a representational state transfer (REST) API. An API is an interface that uses definitions and protocols to facilitate interactions between applications. A REST API transfers a representation of a state of a resource in response to a request. In this case, the tracking query service 140 can transfer the representation as a JSON file. The tracking query service 140 can support several types of queries. For example, one or more of integration instance-based queries, fault-based queries, tracking/billing retrieval queries, and payload access queries can be supported.

The UI 300 can show one or more processes such as process 305, and a total count of processes 310 (e.g., the number of processes identified by the search). The events can be identified by a process (e.g., instance) identifier (ID) 315, and the UI 300 can display a status 320 for the processes. The status 320 can be whether the process succeeded, was aborted, failed, or is pending. A process has succeeded if the process executed as intended, and an aborted process can be a process that was halted before execution was completed. For instance, the process can be halted in response to a user command or an automated instruction to halt cancel the process. A failed process can be a process that failed to execute as intended, and a pending process is one that is currently executing. The UI 300 can display a duration 325 for the process including a start time and an end time for the process. A primary business identifier 330 can be assigned to the processes and additional business identifiers 335 can be shown in the business identifiers field 340.

FIG. 4 shows an example user interface (UI) 400 showing the result of a search according to an embodiment. The UI can be part of the UI service 145 and the search can be a search of documents in the tracking repository 135 that was performed by the tracking query service 140. The disclosed document-based tracking techniques can allow for complex queries including full text searches on tracking fields and error messages. The records of the events are stored in the documents within the tracking repository 135 in such a way that minimizes the performance impact and storage requirements.

Selecting a process, such as process 405, can show an event log 410 showing events associated with the process. A status icon 415 for an event 420 can show a status for the event such as whether the event has succeeded or failed. In this embodiment, the status icon 415 shows that the event 420 has failed. Additional information about the event can be provided for a selected event, and, for example, an error message 425 for a failed event can be displayed in the UI 400. The UI 400 can provide additional information about the event 420, and, for example, the event payload can be downloaded by selecting a download icon 430.

FIG. 5 shows an example user interface (UI) 500 showing the result of a search according to an embodiment. The UI can be part of the UI service 145 and the search can be a search of documents in the tracking repository 135 that was performed by the tracking query service 140. UI 500 can show aggregated data from multiple processes over a time period. A user can specify the time period for the search via the time field 505. The time period can be specified by selecting a start point and an end point for the search. The UI 500 can display processes 510 and the number of events for each process.

The events returned by the search can be organized by process and sorted into categories, and, for instance, the received 515 category can be the number of events associated with a process that were received during the time period. The processed 520 category can be the number of events that were processed during the time period, and the succeeded 525 category can be the number of events that have succeeded (e.g., completed execution). The errored 530 category can be the number of events that did not process and generated an error message, and the aborted 535 category can be the number of events that were aborted by an account. The last scheduled by 540 category can show the account that last scheduled an event for a process.

Figure 6:
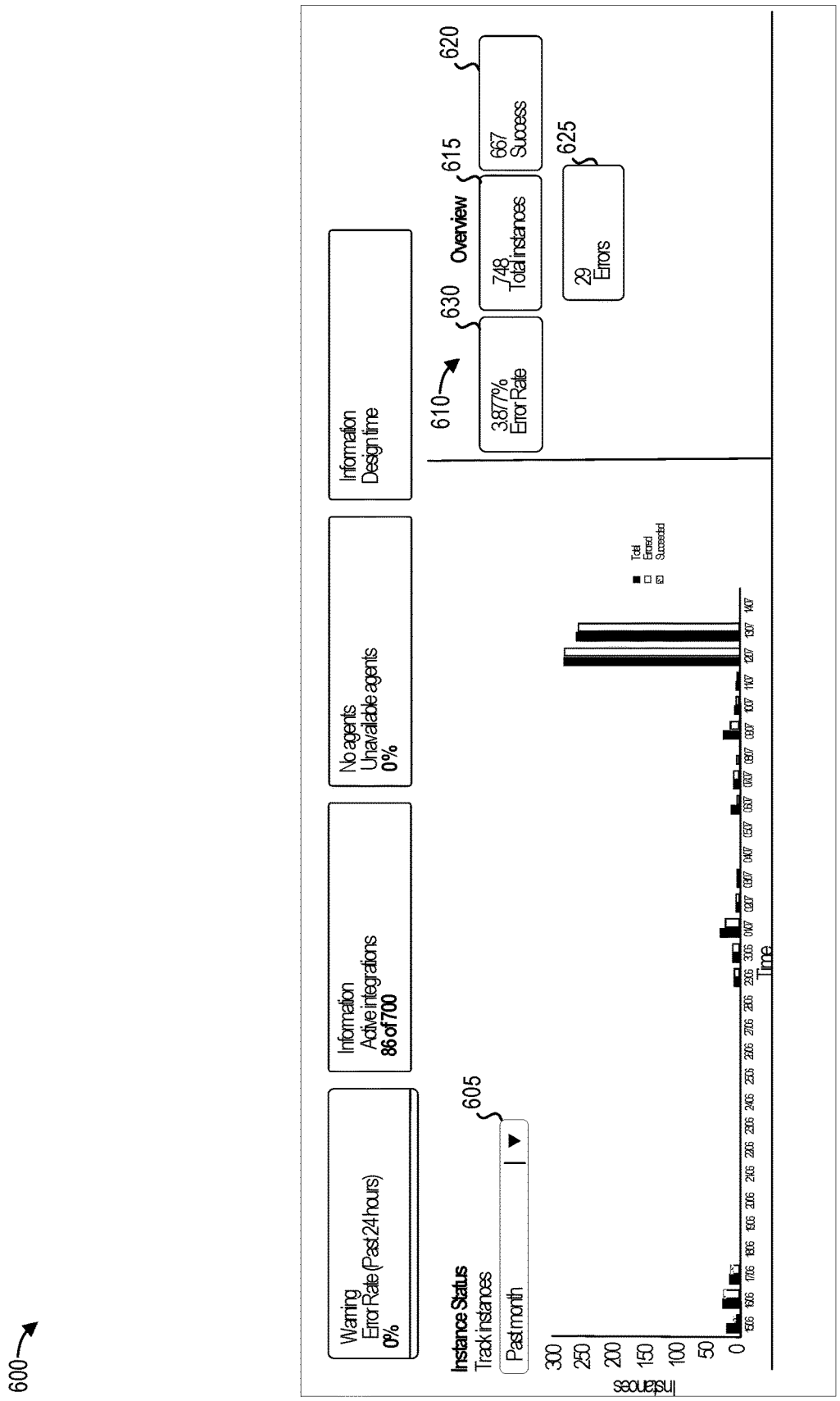
FIG. 6 shows an example user interface (UI) 600 showing the result of a search according to an embodiment.

FIG. 6 shows an example user interface (UI) 600 showing the result of a search according to an embodiment. The UI can be part of the UI service 145 and the search can be a search of documents in the tracking repository 135 that was performed by the tracking query service 140. UI 600 can show aggregated data from multiple processes over a time period. A user can specify the time period for the search via the time field 605. The time period can be specified by selecting a time period such as a start point and an end point for the search. The UI 600 can display the number of events for a process sorted into time periods. For example, the UI 600 shows the number of events for each day within the time periods.

UI 600 can provide summary statistics in overview panel 610. These statistics can include the total number of instances returned by the search, the number of successful instances returned by the search, and the number of errors returned by the search. The total number of instances can be shown by field 615, the number of successful instances can be shown in field 620, and number of errors can be shown in field 625. The overview panel 610 can include statistics that are calculated from the search results. For instance, field 630 can show an error rate calculated from the values shown in field 615 and field 625.

Figure 7:
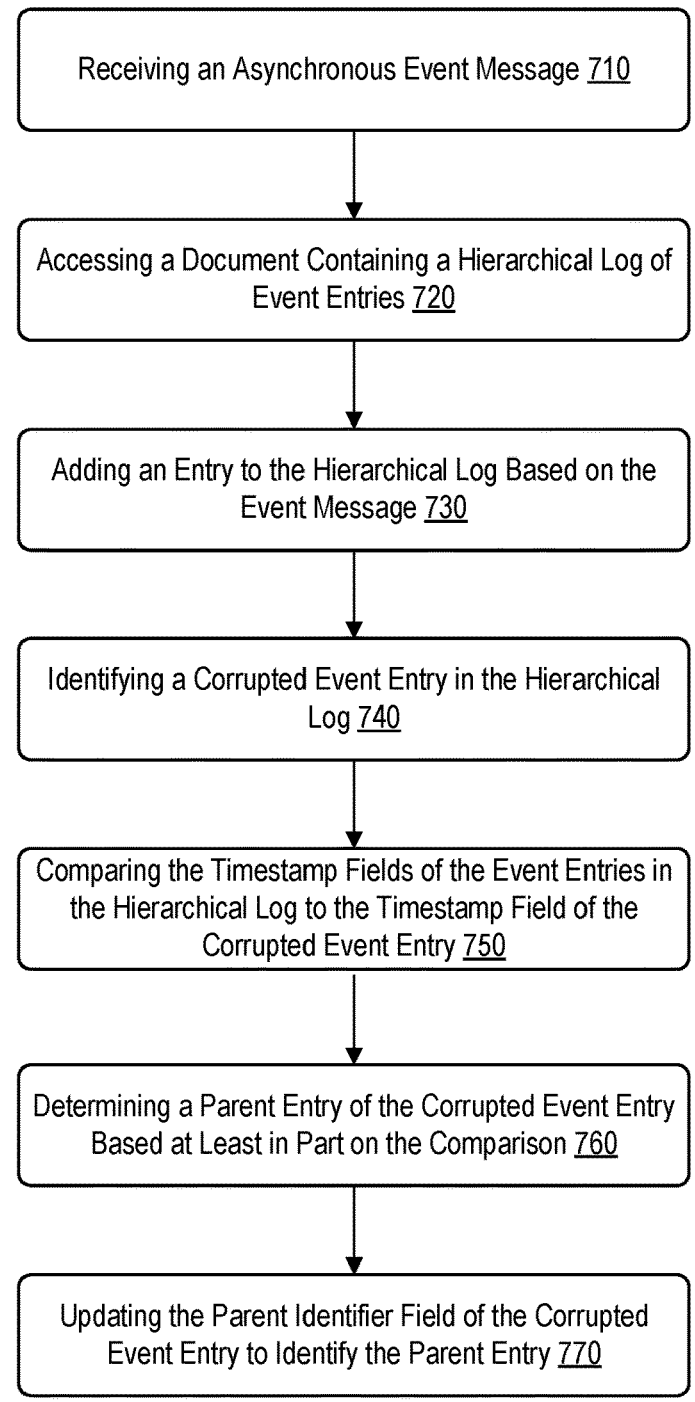
FIG. 7 shows a process for performing a document-based monitoring according to an embodiment.

FIG. 7 shows a process 700 for performing a document-based monitoring according to an embodiment. This process is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The orders in which the operations are described are not intended to be construed as a limitation, and any number of the described operations can be combined in any order and/or in parallel to implement the processes or the method.

At block 710, an event can be received. The event can be an asynchronous message and the message can be received at a tracking publisher service 130 via a messaging service 115. The accessed events can be added to the messaging service from an inbound adapter 105, a scheduler 110, an orchestration microservice 120, or an outbound adapter 125. The event can be associated with a process and the event can be generated by an application. The events may be generated asynchronously, and accessing a document may include creating the document. The inbound adapter 105 can be configured to receive asynchronous messages At block 720, a document containing a hierarchical log of events can be accessed. The document can be accessed from the tracking repository 135 by the tracking publisher service 130. The document can be accessed using identifying information such as a process ID, an event ID, a parent event ID, a time field etc. Accessing the document can mean creating the document, checking the document, or repairing the document. Checking the document can include verifying that the chain of events is intact and that the parent field for each event contains the event ID of the preceding event. Repairing the document can mean using a time field in each event to reconstruct the chain of events. Accessing the document can include creating the document.

At block 730, an entry can be added to the hierarchical log of events. The entry can be added to the hierarchical log of events by creating a new event entry for the event. The new event entry can be added to the log by adding an event ID to the parent field in the new event entry. The event ID added to the parent field can be the event ID for the last event entry added to the hierarchical log. A state field in the document can be updated to reflect changes in the state of the process caused by the event. The event entry can comprise information identifying the asynchronous event message. The information identifying the asynchronous event message can include at least one of a unique identifier (ID) field identifying the asynchronous event message, a process identifier identifying the process that caused the asynchronous event message to be generated, a timestamp field comprising an execution time for the event that generated the event message, or a parent ID field identifying a parent event entry. The entry can contain a state field showing the state of the process that generated the event. The state field can be updated based on a change of the state of the process that generated the event.

At block 740, a corrupted event entry can be identified in the hierarchical log. The event entries in the hierarchical log can be connected by parent child relationships where an entry contains information identifying a parent event (e.g., the event that immediately precedes the event). The information can be contained in a parent identifier field. A corrupted event entry can be one that does not contain information that identifies a parent event or a parent event entry.

At block 750, the timestamp fields of the event entries in the hierarchical log can be compared to the timestamp field of the corrupted event entry. The timestamp field can include information that identifies when the event corresponding to the event entry occurred.

At block 760, a parent entry of the corrupted event entry can be determined based at least in part on the comparison. The parent entry can be the event entry with a timestamp that immediately precedes the corrupted event entry (e.g., the parent entry is the event entry with the nearest timestamp that precedes the timestamp of the corrupted event entry).

At block 770, the parent ID field of the corrupted event entry can be updated to identify the parent entry. Updating the parent ID field can mean adding information identifying the parent event in the parent ID field. The updated hierarchical log can be queried or the updated hierarchical log can be aggregated with one or more additional hierarchical logs.

The hierarchical log of events can be searched using the tracking query service 140. Queries, or searches, can be provided to the document monitoring system via UI service 145. A search result can contain data from one or more hierarchical logs that are retrieved from the tracking repository 135 and aggregated by the tracking query service. Retrieving a hierarchical log from the tracking repository 135 can mean retrieving one or more documents from the repository. The results of searches can be presented to the user via UI service 145, and, for example, UI 300, 400, 500, or 600 can be presented as the user in response to a search request. The search result can be used to determine aggregated statistics that are presented to the user via UI service 145.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 8:
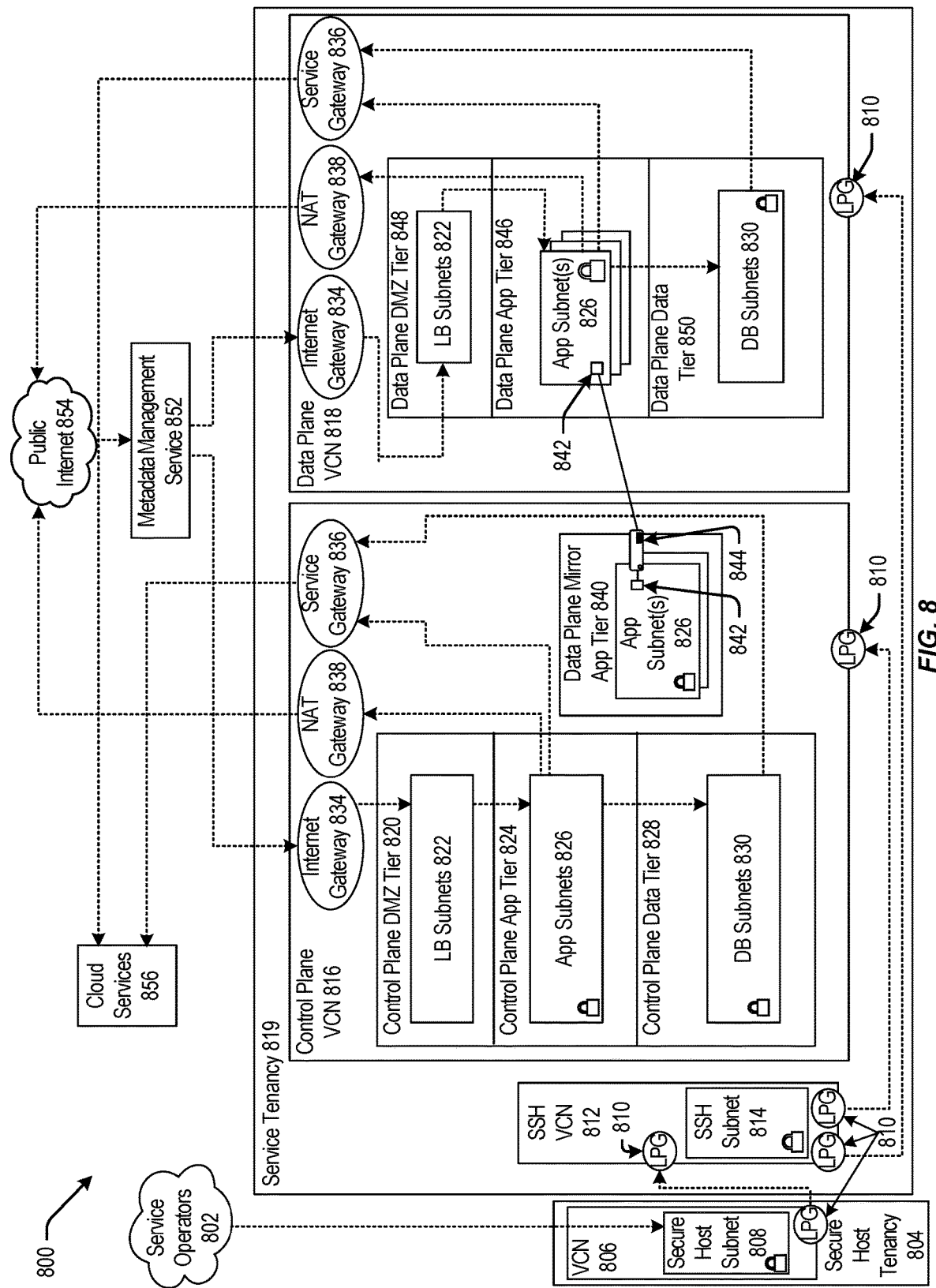
FIG. 8 is a block diagram illustrating one pattern for implementing a cloud infrastructure as a service system, according to at least one embodiment.

FIG. 8 is a block diagram 800 illustrating an example pattern of an IaaS architecture, according to at least one embodiment. Service operators 802 can be communicatively coupled to a secure host tenancy 804 that can include a virtual cloud network (VCN) 806 and a secure host subnet 808. In some examples, the service operators 802 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 806 and/or the Internet.

The VCN 806 can include a local peering gateway (LPG) 810 that can be communicatively coupled to a secure shell (SSH) VCN 812 via an LPG 810 contained in the SSH VCN 812. The SSH VCN 812 can include an SSH subnet 814, and the SSH VCN 812 can be communicatively coupled to a control plane VCN 816 via the LPG 810 contained in the control plane VCN 816. Also, the SSH VCN 812 can be communicatively coupled to a data plane VCN 818 via an LPG 810. The control plane VCN 816 and the data plane VCN 818 can be contained in a service tenancy 819 that can be owned and/or operated by the IaaS provider.

The control plane VCN 816 can include a control plane demilitarized zone (DMZ) tier 820 that acts as a perimeter network (e.g., portions of a corporate network between the corporate intranet and external networks). The DMZ-based servers may have restricted responsibilities and help keep breaches contained. Additionally, the DMZ tier 820 can include one or more load balancer (LB) subnet(s) 822, a control plane app tier 824 that can include app subnet(s) 826, a control plane data tier 828 that can include database (DB) subnet(s) 830 (e.g., frontend DB subnet(s) and/or backend DB subnet(s)). The LB subnet(s) 822 contained in the control plane DMZ tier 820 can be communicatively coupled to the app subnet(s) 826 contained in the control plane app tier 824 and an Internet gateway 834 that can be contained in the control plane VCN 816, and the app subnet(s) 826 can be communicatively coupled to the DB subnet(s) 830 contained in the control plane data tier 828 and a service gateway 836 and a network address translation (NAT) gateway 838. The control plane VCN 816 can include the service gateway 836 and the NAT gateway 838.

The control plane VCN 816 can include a data plane mirror app tier 840 that can include app subnet(s) 826. The app subnet(s) 826 contained in the data plane mirror app tier 840 can include a virtual network interface controller (VNIC) 842 that can execute a compute instance 844. The compute instance 844 can communicatively couple the app subnet(s) 826 of the data plane mirror app tier 840 to app subnet(s) 826 that can be contained in a data plane app tier 846.

The data plane VCN 818 can include the data plane app tier 846, a data plane DMZ tier 848, and a data plane data tier 850. The data plane DMZ tier 848 can include LB subnet(s) 822 that can be communicatively coupled to the app subnet(s) 826 of the data plane app tier 846 and the Internet gateway 834 of the data plane VCN 818. The app subnet(s) 826 can be communicatively coupled to the service gateway 836 of the data plane VCN 818 and the NAT gateway 838 of the data plane VCN 818. The data plane data tier 850 can also include the DB subnet(s) 830 that can be communicatively coupled to the app subnet(s) 826 of the data plane app tier 846.

The Internet gateway 834 of the control plane VCN 816 and of the data plane VCN 818 can be communicatively coupled to a metadata management service 852 that can be communicatively coupled to public Internet 854. Public Internet 854 can be communicatively coupled to the NAT gateway 838 of the control plane VCN 816 and of the data plane VCN 818. The service gateway 836 of the control plane VCN 816 and of the data plane VCN 818 can be communicatively couple to cloud services 856.

In some examples, the service gateway 836 of the control plane VCN 816 or of the data plane VCN 818 can make application programming interface (API) calls to cloud services 856 without going through public Internet 854. The API calls to cloud services 856 from the service gateway 836 can be one-way: the service gateway 836 can make API calls to cloud services 856, and cloud services 856 can send requested data to the service gateway 836. But, cloud services 856 may not initiate API calls to the service gateway 836.

In some examples, the secure host tenancy 804 can be directly connected to the service tenancy 819, which may be otherwise isolated. The secure host subnet 808 can communicate with the SSH subnet 814 through an LPG 810 that may enable two-way communication over an otherwise isolated system. Connecting the secure host subnet 808 to the SSH subnet 814 may give the secure host subnet 808 access to other entities within the service tenancy 819.

The control plane VCN 816 may allow users of the service tenancy 819 to set up or otherwise provision desired resources. Desired resources provisioned in the control plane VCN 816 may be deployed or otherwise used in the data plane VCN 818. In some examples, the control plane VCN 816 can be isolated from the data plane VCN 818, and the data plane mirror app tier 840 of the control plane VCN 816 can communicate with the data plane app tier 846 of the data plane VCN 818 via VNICs 842 that can be contained in the data plane mirror app tier 840 and the data plane app tier 846.

In some examples, users of the system, or customers, can make requests, for example create, read, update, or delete (CRUD) operations, through public Internet 854 that can communicate the requests to the metadata management service 852. The metadata management service 852 can communicate the request to the control plane VCN 816 through the Internet gateway 834. The request can be received by the LB subnet(s) 822 contained in the control plane DMZ tier 820. The LB subnet(s) 822 may determine that the request is valid, and in response to this determination, the LB subnet(s) 822 can transmit the request to app subnet(s) 826 contained in the control plane app tier 824. If the request is validated and requires a call to public Internet 854, the call to public Internet 854 may be transmitted to the NAT gateway 838 that can make the call to public Internet 854. Metadata that may be desired to be stored by the request can be stored in the DB subnet(s) 830.

In some examples, the data plane mirror app tier 840 can facilitate direct communication between the control plane VCN 816 and the data plane VCN 818. For example, changes, updates, or other suitable modifications to configuration may be desired to be applied to the resources contained in the data plane VCN 818. Via a VNIC 842, the control plane VCN 816 can directly communicate with, and can thereby execute the changes, updates, or other suitable modifications to configuration to, resources contained in the data plane VCN 818.

In some embodiments, the control plane VCN 816 and the data plane VCN 818 can be contained in the service tenancy 819. In this case, the user, or the customer, of the system may not own or operate either the control plane VCN 816 or the data plane VCN 818. Instead, the IaaS provider may own or operate the control plane VCN 816 and the data plane VCN 818, both of which may be contained in the service tenancy 819. This embodiment can enable isolation of networks that may prevent users or customers from interacting with other users', or other customers', resources. Also, this embodiment may allow users or customers of the system to store databases privately without needing to rely on public Internet 854, which may not have a desired level of threat prevention, for storage.

In other embodiments, the LB subnet(s) 822 contained in the control plane VCN 816 can be configured to receive a signal from the service gateway 836. In this embodiment, the control plane VCN 816 and the data plane VCN 818 may be configured to be called by a customer of the IaaS provider without calling public Internet 854. Customers of the IaaS provider may desire this embodiment since database(s) that the customers use may be controlled by the IaaS provider and may be stored on the service tenancy 819, which may be isolated from public Internet 854.

Figure 9:
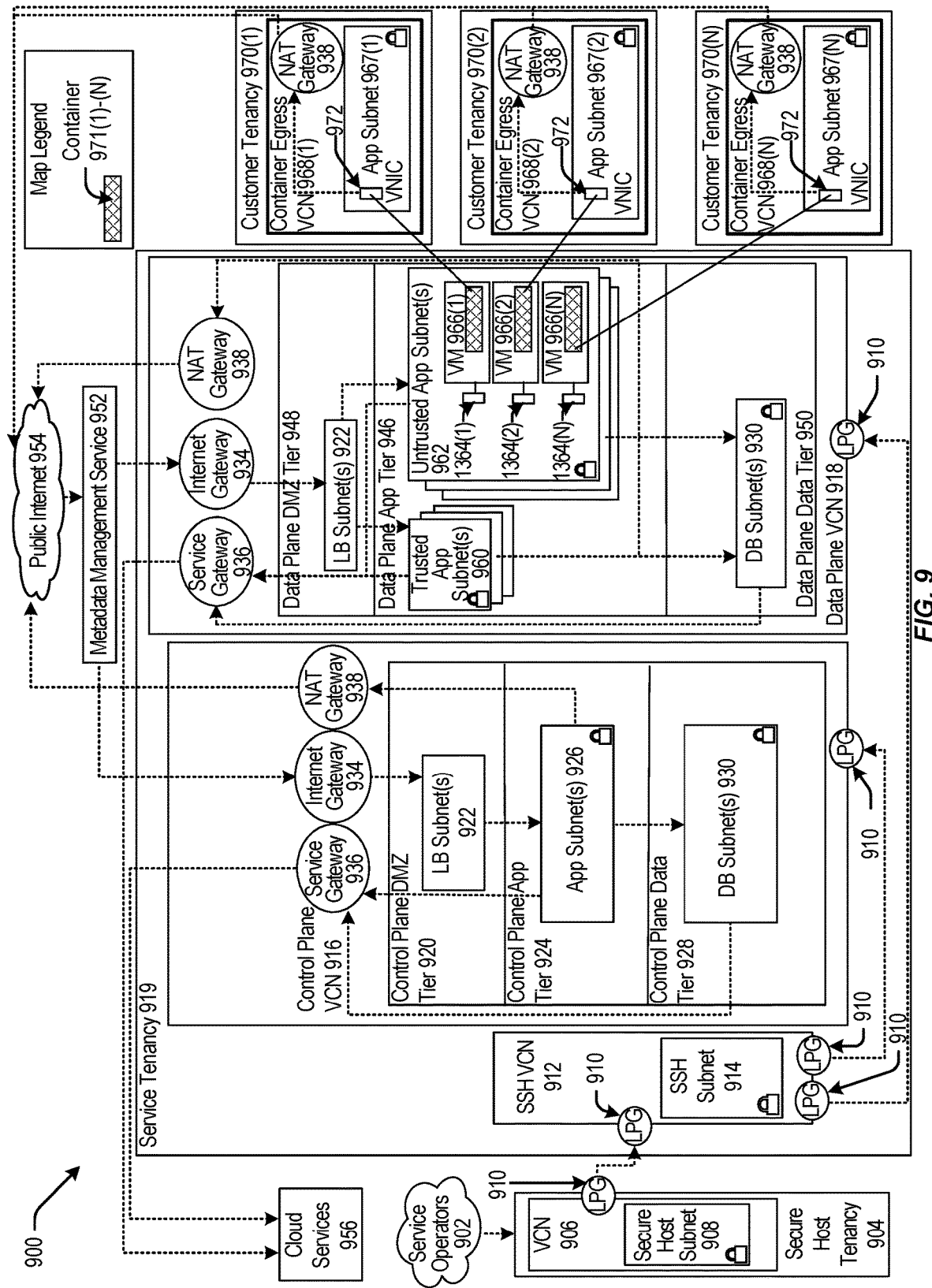
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g., service operators 802 of FIG. 8) can be communicatively coupled to a secure host tenancy 904 (e.g., the secure host tenancy 804 of FIG.

8) that can include a virtual cloud network (VCN) 906 (e.g., the VCN 806 of FIG. 8) and a secure host subnet 908 (e.g., the secure host subnet 808 of FIG. 8). The VCN 906 can include a local peering gateway (LPG) 910 (e.g., the LPG 810 of FIG. 8) that can be communicatively coupled to a secure shell (SSH) VCN 912 (e.g., the SSH VCN 812 of FIG. 8) via an LPG 810 contained in the SSH VCN 912. The SSH VCN 912 can include an SSH subnet 914 (e.g., the SSH subnet 814 of FIG. 8), and the SSH VCN 912 can be communicatively coupled to a control plane VCN 916 (e.g., the control plane VCN 816 of FIG. 8) via an LPG 910 contained in the control plane VCN 916. The control plane VCN 916 can be contained in a service tenancy 919 (e.g., the service tenancy 819 of FIG. 8), and the data plane VCN 918 (e.g., the data plane VCN 818 of FIG. 8) can be contained in a customer tenancy 921 that may be owned or operated by users, or customers, of the system.

The control plane VCN 916 can include a control plane DMZ tier 920 (e.g., the control plane DMZ tier 820 of FIG. 8) that can include LB subnet(s) 922 (e.g., LB subnet(s) 822 of FIG. 8), a control plane app tier 924 (e.g., the control plane app tier 824 of FIG. 8) that can include app subnet(s) 926 (e.g., app subnet(s) 826 of FIG. 8), a control plane data tier 928 (e.g., the control plane data tier 828 of FIG. 8) that can include database (DB) subnet(s) 930 (e.g., similar to DB subnet(s) 830 of FIG. 8). The LB subnet(s) 922 contained in the control plane DMZ tier 920 can be communicatively coupled to the app subnet(s) 926 contained in the control plane app tier 924 and an Internet gateway 934 (e.g., the Internet gateway 834 of FIG. 8) that can be contained in the control plane VCN 916, and the app subnet(s) 926 can be communicatively coupled to the DB subnet(s) 930 contained in the control plane data tier 928 and a service gateway 936 (e.g., the service gateway 836 of FIG. 8) and a network address translation (NAT) gateway 938 (e.g., the NAT gateway 838 of FIG. 8). The control plane VCN 916 can include the service gateway 936 and the NAT gateway 938.

The control plane VCN 916 can include a data plane mirror app tier 940 (e.g., the data plane mirror app tier 840 of FIG. 8) that can include app subnet(s) 926. The app subnet(s) 926 contained in the data plane mirror app tier 940 can include a virtual network interface controller (VNIC) 942 (e.g., the VNIC of 842) that can execute a compute instance 944 (e.g., similar to the compute instance 844 of FIG. 8). The compute instance 944 can facilitate communication between the app subnet(s) 926 of the data plane mirror app tier 940 and the app subnet(s) 926 that can be contained in a data plane app tier 946 (e.g., the data plane app tier 846 of FIG. 8) via the VNIC 942 contained in the data plane mirror app tier 940 and the VNIC 942 contained in the data plane app tier 946.

The Internet gateway 934 contained in the control plane VCN 916 can be communicatively coupled to a metadata management service 952 (e.g., the metadata management service 852 of FIG. 8) that can be communicatively coupled to public Internet 954 (e.g., public Internet 854 of FIG. 8). Public Internet 954 can be communicatively coupled to the NAT gateway 938 contained in the control plane VCN 916. The service gateway 936 contained in the control plane VCN 916 can be communicatively couple to cloud services 956 (e.g., cloud services 856 of FIG. 8).

In some examples, the data plane VCN 918 can be contained in the customer tenancy 921. In this case, the IaaS provider may provide the control plane VCN 916 for each customer, and the IaaS provider may, for each customer, set up a unique compute instance 944 that is contained in the service tenancy 919. Each compute instance 944 may allow communication between the control plane VCN 916, contained in the service tenancy 919, and the data plane VCN 918 that is contained in the customer tenancy 921. The compute instance 944 may allow resources, that are provisioned in the control plane VCN 916 that is contained in the service tenancy 919, to be deployed or otherwise used in the data plane VCN 918 that is contained in the customer tenancy 921.

In other examples, the customer of the IaaS provider may have databases that live in the customer tenancy 921. In this example, the control plane VCN 916 can include the data plane mirror app tier 940 that can include app subnet(s) 926. The data plane mirror app tier 940 can reside in the data plane VCN 918, but the data plane mirror app tier 940 may not live in the data plane VCN 918. That is, the data plane mirror app tier 940 may have access to the customer tenancy 921, but the data plane mirror app tier 940 may not exist in the data plane VCN 918 or be owned or operated by the customer of the IaaS provider. The data plane mirror app tier 940 may be configured to make calls to the data plane VCN 918 but may not be configured to make calls to any entity contained in the control plane VCN 916. The customer may desire to deploy or otherwise use resources in the data plane VCN 918 that are provisioned in the control plane VCN 916, and the data plane mirror app tier 940 can facilitate the desired deployment, or other usage of resources, of the customer.

In some embodiments, the customer of the IaaS provider can apply filters to the data plane VCN 918. In this embodiment, the customer can determine what the data plane VCN 918 can access, and the customer may restrict access to public Internet 954 from the data plane VCN 918. The IaaS provider may not be able to apply filters or otherwise control access of the data plane VCN 918 to any outside networks or databases. Applying filters and controls by the customer onto the data plane VCN 918, contained in the customer tenancy 921, can help isolate the data plane VCN 918 from other customers and from public Internet 954.

In some embodiments, cloud services 956 can be called by the service gateway 936 to access services that may not exist on public Internet 954, on the control plane VCN 916, or on the data plane VCN 918. The connection between cloud services 956 and the control plane VCN 916 or the data plane VCN 918 may not be live or continuous. Cloud services 956 may exist on a different network owned or operated by the IaaS provider. Cloud services 956 may be configured to receive calls from the service gateway 936 and may be configured to not receive calls from public Internet 954. Some cloud services 956 may be isolated from other cloud services 956, and the control plane VCN 916 may be isolated from cloud services 956 that may not be in the same region as the control plane VCN 916. For example, the control plane VCN 916 may be located in "Region 1," and cloud service "Deployment 8," may be located in Region 1 and in "Region 2." If a call to Deployment 8 is made by the service gateway 936 contained in the control plane VCN 916 located in Region 1, the call may be transmitted to Deployment 8 in Region 1. In this example, the control plane VCN 916, or Deployment 8 in Region 1, may not be communicatively coupled to, or otherwise in communication with, Deployment 8 in Region 2.

Figure 10:
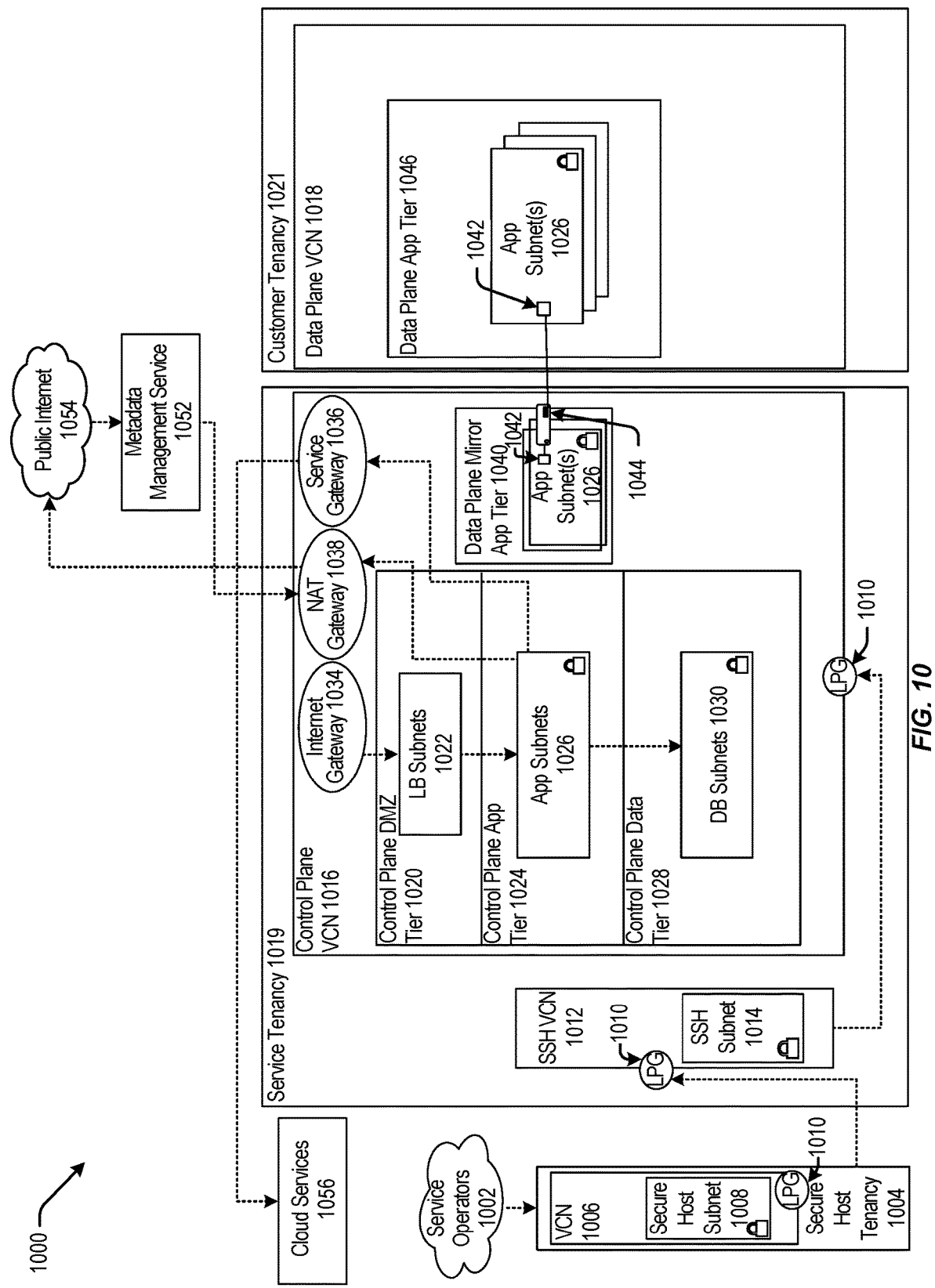
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g., service operators 802 of FIG. 8) can be communicatively coupled to a secure host tenancy 1004 (e.g., the secure host tenancy 804 of FIG. 8) that can include a virtual cloud network (VCN)

1006 (e.g., the VCN 806 of FIG. 8) and a secure host subnet 1008 (e.g., the secure host subnet 808 of FIG. 8). The VCN 1006 can include an LPG 1010 (e.g., the LPG 810 of FIG. 8) that can be communicatively coupled to an SSH VCN 1012 (e.g., the SSH VCN 812 of FIG. 8) via an LPG 1010 contained in the SSH VCN 1012. The SSH VCN 1012 can include an SSH subnet 1014 (e.g., the SSH subnet 814 of FIG. 8), and the SSH VCN 1012 can be communicatively coupled to a control plane VCN 1016 (e.g., the control plane VCN 816 of FIG. 8) via an LPG 1010 contained in the control plane VCN 1016 and to a data plane VCN 1018 (e.g., the data plane 818 of FIG. 8) via an LPG 1010 contained in the data plane VCN 1018. The control plane VCN 1016 and the data plane VCN 1018 can be contained in a service tenancy 1019 (e.g., the service tenancy 819 of FIG. 8).

The control plane VCN 1016 can include a control plane DMZ tier 1020 (e.g., the control plane DMZ tier 820 of FIG. 8) that can include load balancer (LB) subnet(s) 1022 (e.g., LB subnet(s) 822 of FIG. 8), a control plane app tier 1024 (e.g., the control plane app tier 824 of FIG. 8) that can include app subnet(s) 1026 (e.g., similar to app subnet(s) 826 of FIG. 8), a control plane data tier 1028 (e.g., the control plane data tier 828 of FIG. 8) that can include DB subnet(s) 1030. The LB subnet(s) 1022 contained in the control plane DMZ tier 1020 can be communicatively coupled to the app subnet(s) 1026 contained in the control plane app tier 1024 and to an Internet gateway 1034 (e.g., the Internet gateway 834 of FIG. 8) that can be contained in the control plane VCN 1016, and the app subnet(s) 1026 can be communicatively coupled to the DB subnet(s) 1030 contained in the control plane data tier 1028 and to a service gateway 1036 (e.g., the service gateway of FIG. 8) and a network address translation (NAT) gateway 1038 (e.g., the NAT gateway 838 of FIG. 8). The control plane VCN 1016 can include the service gateway 1036 and the NAT gateway 1038.

The data plane VCN 1018 can include a data plane app tier 1046 (e.g., the data plane app tier 846 of FIG. 8), a data plane DMZ tier 1048 (e.g., the data plane DMZ tier 848 of FIG. 8), and a data plane data tier 1050 (e.g., the data plane data tier 850 of FIG. 8). The data plane DMZ tier 1048 can include LB subnet(s) 1022 that can be communicatively coupled to trusted app subnet(s) 1060 and untrusted app subnet(s) 1062 of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include one or more primary VNICs 1064(1)-(N) that can be communicatively coupled to tenant virtual machines (VMs) 1066(1)-(N). Each tenant VM 1066(1)-(N) can be communicatively coupled to a respective app subnet 1067(1)-(N) that can be contained in respective container egress VCNs 1068(1)-(N) that can be contained in respective customer tenancies 1070(1)-(N). Respective secondary VNICs 1072(1)-(N) can facilitate communication between the untrusted app subnet(s) 1062 contained in the data plane VCN 1018 and the app subnet contained in the container egress VCNs 1068(1)-(N). Each container egress VCNs 1068(1)-(N) can include a NAT gateway 1038 that can be communicatively coupled to public Internet 1054 (e.g., public Internet 854 of FIG. 8).

The Internet gateway 1034 contained in the control plane VCN 1016 and contained in the data plane VCN 1018 can be communicatively coupled to a metadata management service 1052 (e.g., the metadata management system 852 of FIG. 8) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some embodiments, the data plane VCN 1018 can be integrated with customer tenancies 1070. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1046. Code to run the function may be executed in the VMs 1066(1)-(N), and the code may not be configured to run anywhere else on the data plane VCN 1018. Each VM 1066(1)-(N) may be connected to one customer tenancy 1070. Respective containers 1071(1)-(N) contained in the VMs 1066(1)-(N) may be configured to run the code. In this case, there can be a dual isolation (e.g., the containers 1071(1)-(N) running code, where the containers 1071(1)-(N) may be contained in at least the VM 1066(1)-(N) that are contained in the untrusted app subnet(s) 1062), which may help prevent incorrect or otherwise undesirable code from damaging the network of the IaaS provider or from damaging a network of a different customer. The containers 1071(1)-(N) may be communicatively coupled to the customer tenancy 1070 and may be configured to transmit or receive data from the customer tenancy 1070. The containers 1071(1)-(N) may not be configured to transmit or receive data from any other entity in the data plane VCN 1018. Upon completion of running the code, the IaaS provider may kill or otherwise dispose of the containers 1071(1)-(N).

In some embodiments, the trusted app subnet(s) 1060 may run code that may be owned or operated by the IaaS provider. In this embodiment, the trusted app subnet(s) 1060 may be communicatively coupled to the DB subnet(s) 1030 and be configured to execute CRUD operations in the DB subnet(s) 1030. The untrusted app subnet(s) 1062 may be communicatively coupled to the DB subnet(s) 1030, but in this embodiment, the untrusted app subnet(s) may be configured to execute read operations in the DB subnet(s) 1030. The containers 1071(1)-(N) that can be contained in the VM 1066(1)-(N) of each customer and that may run code from the customer may not be communicatively coupled with the DB subnet(s) 1030.

In other embodiments, the control plane VCN 1016 and the data plane VCN 1018 may not be directly communicatively coupled. In this embodiment, there may be no direct communication between the control plane VCN 1016 and the data plane VCN 1018. However, communication can occur indirectly through at least one method. An LPG 1010 may be established by the IaaS provider that can facilitate communication between the control plane VCN 1016 and the data plane VCN 1018. In another example, the control plane VCN 1016 or the data plane VCN 1018 can make a call to cloud services 1056 via the service gateway 1036. For example, a call to cloud services 1056 from the control plane VCN 1016 can include a request for a service that can communicate with the data plane VCN 1018.

Figure 11:
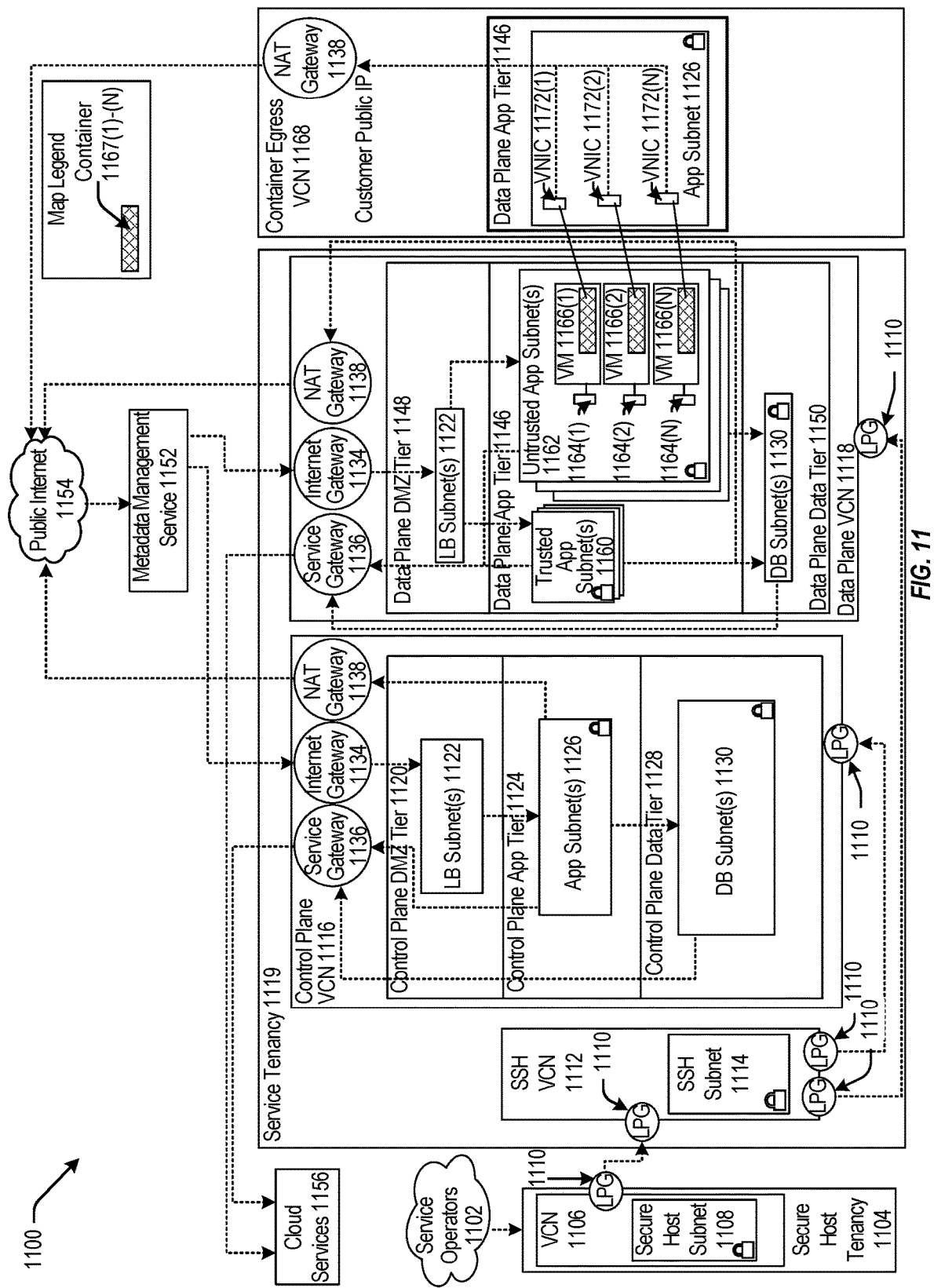
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g., service operators 802 of FIG. 8) can be communicatively coupled to a secure host tenancy 1104 (e.g., the secure host tenancy 804 of FIG. 8) that can include a virtual cloud network (VCN) 1106 (e.g., the VCN 806 of FIG. 8) and a secure host subnet 1108 (e.g., the secure host subnet 808 of FIG. 8). The VCN 1106 can include an LPG 1110 (e.g., the LPG 810 of FIG. 8) that can be communicatively coupled to an SSH VCN 1112 (e.g., the SSH VCN 812 of FIG. 8) via an LPG 1110 contained in the SSH VCN 1112. The SSH VCN 1112 can include an SSH subnet 1114 (e.g., the SSH subnet 814 of FIG. 8), and the SSH VCN 1112 can be communicatively coupled to a control plane VCN 1116 (e.g., the control plane VCN 816 of FIG. 8) via an LPG 1110 contained in the control plane VCN 1116 and to a data plane VCN 1118 (e.g., the data plane 818 of FIG. 8) via an LPG 1110 contained in the data plane VCN 1118. The control plane VCN 1116 and the data plane VCN 1118 can be contained in a service tenancy 1119 (e.g., the service tenancy 819 of FIG. 8).

The control plane VCN 1116 can include a control plane DMZ tier 1120 (e.g., the control plane DMZ tier 820 of FIG. 8) that can include LB subnet(s) 1122 (e.g., LB subnet(s) 822 of FIG. 8), a control plane app tier 1124 (e.g., the control plane app tier 824 of FIG. 8) that can include app subnet(s) 1126 (e.g., app subnet(s) 826 of FIG. 8), a control plane data tier 1128 (e.g., the control plane data tier 828 of FIG. 8) that can include DB subnet(s) 1130 (e.g., DB subnet(s) 1030 of FIG. 10). The LB subnet(s) 1122 contained in the control plane DMZ tier 1120 can be communicatively coupled to the app subnet(s) 1126 contained in the control plane app tier 1124 and to an Internet gateway 1134 (e.g., the Internet gateway 834 of FIG. 8) that can be contained in the control plane VCN 1116, and the app subnet(s) 1126 can be communicatively coupled to the DB subnet(s) 1130 contained in the control plane data tier 1128 and to a service gateway 1136 (e.g., the service gateway of FIG. 8) and a network address translation (NAT) gateway 1138 (e.g., the NAT gateway 838 of FIG. 8). The control plane VCN 1116 can include the service gateway 1136 and the NAT gateway 1138.

The data plane VCN 1118 can include a data plane app tier 1146 (e.g., the data plane app tier 846 of FIG. 8), a data plane DMZ tier 1148 (e.g., the data plane DMZ tier 848 of FIG. 8), and a data plane data tier 1150 (e.g., the data plane data tier 850 of FIG. 8). The data plane DMZ tier 1148 can include LB subnet(s) 1122 that can be communicatively coupled to trusted app subnet(s) 1160 (e.g., trusted app subnet(s) 1060 of FIG. 10) and untrusted app subnet(s) 1162 (e.g., untrusted app subnet(s) 1062 of FIG. 10) of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include primary VNICs 1164(1)-(N) that can be communicatively coupled to tenant virtual machines (VMs) 1166(1)-(N) residing within the untrusted app subnet(s) 1162. Each tenant VM 1166(1)-(N) can run code in a respective container 1167(1)-(N), and be communicatively coupled to an app subnet 1126 that can be contained in a data plane app tier 1146 that can be contained in a container egress VCN 1168. Respective secondary VNICs 1172(1)-(N) can facilitate communication between the untrusted app subnet(s) 1162 contained in the data plane VCN 1118 and the app subnet contained in the container egress VCN 1168. The container egress VCN can include a NAT gateway 1138 that can be communicatively coupled to public Internet 1154 (e.g., public Internet 854 of FIG. 8).

The Internet gateway 1134 contained in the control plane VCN 1116 and contained in the data plane VCN 1118 can be communicatively coupled to a metadata management service 1152 (e.g., the metadata management system 852 of FIG. 8) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively couple to cloud services 1156.

In some examples, the pattern illustrated by the architecture of block diagram 1100 of FIG. 11 may be considered an exception to the pattern illustrated by the architecture of block diagram 1000 of FIG. 10 and may be desirable for a customer of the IaaS provider if the IaaS provider cannot directly communicate with the customer (e.g., a disconnected region). The respective containers 1167(1)-(N) that are contained in the VMs 1166(1)-(N) for each customer can be accessed in real-time by the customer. The containers 1167(1)-(N) may be configured to make calls to respective secondary VNICs 1172(1)-(N) contained in app subnet(s) 1126 of the data plane app tier 1146 that can be contained in the container egress VCN 1168. The secondary VNICs 1172(1)-(N) can transmit the calls to the NAT gateway 1138 that may transmit the calls to public Internet 1154. In this example, the containers 1167(1)-(N) that can be accessed in real-time by the customer can be isolated from the control plane VCN 1116 and can be isolated from other entities contained in the data plane VCN 1118. The containers 1167(1)-(N) may also be isolated from resources from other customers.

In other examples, the customer can use the containers 1167(1)-(N) to call cloud services 1156. In this example, the customer may run code in the containers 1167(1)-(N) that requests a service from cloud services 1156. The containers 1167(1)-(N) can transmit this request to the secondary VNICs 1172(1)-(N) that can transmit the request to the NAT gateway that can transmit the request to public Internet 1154. Public Internet 1154 can transmit the request to LB subnet(s) 1122 contained in the control plane VCN 1116 via the Internet gateway 1134. In response to determining the request is valid, the LB subnet(s) can transmit the request to app subnet(s) 1126 that can transmit the request to cloud services 1156 via the service gateway 1136.

It should be appreciated that IaaS architectures 800, 900, 1000, 1100 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 12:
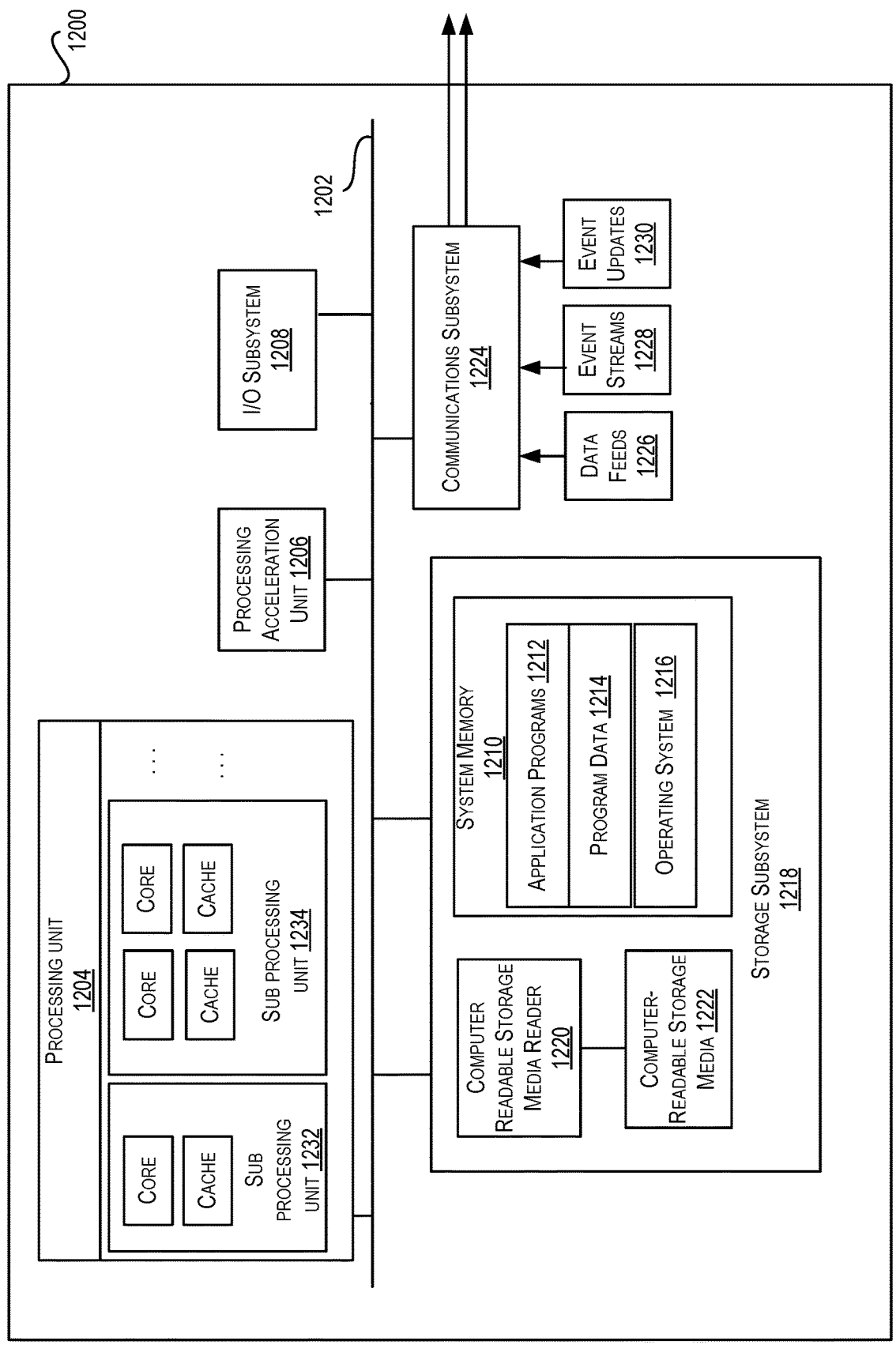
FIG. 12 is a block diagram illustrating an example computer system, according to at least one embodiment.

FIG. 12 illustrates an example computer system 1200, in which various embodiments may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1204 provide the functionality described above. Storage subsystem 1218 may also provide a repository for storing data used in accordance with the present disclosure.

As depicted in the example in FIG. 12, storage subsystem 1218 can include various components including a system memory 1210, computer-readable storage media 1222, and a computer readable storage media reader 1220. System memory 1210 may store program instructions that are loadable and executable by processing unit 1204. System memory 1210 may also store data that is used during the execution of the instructions and/or data that is generated during the execution of the program instructions. Various different kinds of programs may be loaded into system memory 1210 including but not limited to client applications, Web browsers, mid-tier applications, relational database management systems (RDBMS), virtual machines, containers, etc.

System memory 1210 may also store an operating system 1216. Examples of operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1200 executes one or more virtual machines, the virtual machines along with their guest operating systems (GOSs) may be loaded into system memory 1210 and executed by one or more processors or cores of processing unit 1204.

System memory 1210 can come in different configurations depending upon the type of computer system 1200. For example, system memory 1210 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1210 may include a basic input/output system (BIOS) containing basic routines that help to transfer information between elements within computer system 1200, such as during start-up.

Computer-readable storage media 1222 may represent remote, local, fixed, and/or removable storage devices plus storage media for temporarily and/or more permanently containing, storing, computer-readable information for use by computer system 1200 including instructions executable by processing unit 1204 of computer system 1200.

Computer-readable storage media 1222 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1222 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Machine-readable instructions executable by one or more processors or cores of processing unit 1204 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
  receiving, by a computing device, an asynchronous event message at an inbound adapter of a document-based monitoring system, wherein the inbound adapter is configured to receive asynchronous event messages, and wherein the asynchronous event message is generated by an execution of a process of one or more processes for which a hierarchical log of event entries is maintained in a document;
  accessing, by the computing device, the document containing the hierarchical log of event entries, wherein the document is stored in a tracking repository of the document-based monitoring system, wherein the tracking repository permits substantially simultaneous access to the document by two or more computing devices, and wherein the hierarchical log of event entries is a record of both a state of the process and logging information for the one or more processes;

adding, by the computing device, an event entry to the hierarchical log in the tracking repository based at least in part on the asynchronous event message, and wherein the event entry comprises information identifying the asynchronous event message, wherein the information includes of a unique identifier (ID) field identifying the asynchronous event message, a process identifier (ID) field identifying the process that caused the asynchronous event message to be generated, a timestamp field comprising an execution time for the event that generated the event message, and a parent identifier (ID) field identifying a parent event entry;

identifying, by the computing device, a corrupted event entry in the hierarchical log;

comparing, by the computing device, the timestamp fields of the event entries in the hierarchical log to the timestamp field of the corrupted event entry;

determining, by the computing device, a parent entry of the corrupted event entry based at least in part on the comparison, wherein the parent event entry immediately precedes the corrupted event entry; and updating, by the computing device, the parent identifier (ID) field of the corrupted event entry to identify the parent entry.

2. The method of claim 1, wherein the parent event entry for the corrupted event entry cannot be identified with the parent ID field of the corrupted event entry.

3. The method of claim 1, wherein accessing the document further comprises creating the document.

4. The method of claim 1, wherein the corrupted event entry contains a state field showing a state of the process.

5. The method of claim 4, further comprising:
updating, by the computing device, the state field based on a change in the state of the process.

6. The method of claim 1, further comprising:
querying, by the computing device, the hierarchical log.

7. The method of claim 1, wherein the method further comprises:
aggregating, by the computing device, the hierarchical log with one or more additional hierarchical logs.

8. A non-transitory computer-readable medium storing a plurality of instructions that when executed control a computer system to perform operations comprising:
receiving an asynchronous event message at an inbound adapter of a document-based monitoring system, wherein the inbound adapter is configured to receive asynchronous event messages, and wherein the asynchronous event message is generated by an execution of a process of one or more processes for which a hierarchical log of event entries is maintained in a document;
accessing the document containing the hierarchical log of event entries, wherein the document is stored in a tracking repository of the document-based monitoring system, wherein the tracking repository permits substantially simultaneous access to the document by two or more computing devices, and wherein the hierarchical log of event entries is a record of both a state of the process and logging information for the one or more processes;
adding an event entry to the hierarchical log in the tracking repository based at least in part on the event asynchronous message, and wherein the event entry comprises information identifying the asynchronous event message, wherein the information includes a unique identifier (ID) field identifying the asynchronous event message, a process identifier (ID) field identifying the process that caused the asynchronous event message to be generated, a timestamp field comprising an execution time for the event that generated the event message, and a parent identifier (ID) field identifying a parent event entry;
identifying a corrupted event entry in the hierarchical log;
comparing the timestamp fields of the event entries in the hierarchical log to the timestamp field of the corrupted event entry;
determining a parent event entry of the corrupted event entry based at least in part on the comparison, wherein the parent event entry immediately precedes the corrupted event entry; and
updating the parent identifier (ID) field of the corrupted event entry to identify the parent entry.

9. The medium of claim 8, wherein the parent event entry for the corrupted event entry cannot be identified with the parent ID field of the corrupted event entry.

10. The medium of claim 8, wherein accessing the document further comprises creating the document.

11. The medium of claim 8, wherein the corrupted event entry contains a state field showing a state of the process.

12. The medium of claim 11, further comprising:
updating the state field based on a change in the state of the process.

13. The medium of claim 8, further comprising:
querying the hierarchical log.

14. The medium of claim 8, wherein the instructions further comprise:
aggregating the hierarchical log with one or more additional hierarchical logs.

15. A system comprising:
a non-transitory computer-readable medium; and
one or more processors for executing instructions stored on the computer-readable medium to at least perform operations comprising:
receiving an asynchronous event message at an inbound adapter of a document-based monitoring system, wherein the inbound adapter is configured to receive asynchronous event messages, and wherein the asynchronous event message is generated by an execution of a process of one or more processes for which a hierarchical log of event entries is maintained in a document;
accessing the document containing the hierarchical log of event entries, wherein the document is stored in a tracking repository of the document-based monitoring system, wherein the tracking repository permits substantially simultaneous access to the document by two or more computing devices, and wherein the hierarchical log of event entries is a record of both a state of the process and logging information for the one or more processes;
adding an event entry to the hierarchical log in the tracking repository based at least in part on the asynchronous event message, and wherein the event entry comprises information identifying the asynchronous event message, wherein the information includes at least one of a unique identifier (ID) field identifying the asynchronous event message, a process identifier (ID) field identifying the process that caused the asynchronous event message to be generated, a timestamp field comprising an execution time for the event that generated the event message, and a parent identifier (ID) field identifying a parent event entry;

identifying a corrupted event entry in the hierarchical log;

comparing the timestamp fields of the event entries in the hierarchical log to the timestamp field of the corrupted event entry;

determining a parent event entry of the corrupted event entry based at least in part on the comparison, wherein the parent event entry immediately precedes the corrupted event entry; and updating the parent identifier (ID) field of the corrupted event entry to identify the parent entry.

16. The system of claim 15, wherein the parent event entry for the corrupted event entry cannot be identified with the parent ID field of the corrupted event entry.

17. The system of claim 15, wherein accessing the document further comprises creating the document.

18. The system of claim 15, wherein the corrupted event entry contains a state field showing a state of the process.

19. The system of claim 18, further comprising:
updating the state field based on a change in the state of the process.

20. The system of claim 15, further comprising:
querying the hierarchical log.

* * * * *

UNITED STATES PATENT AND TRADEMARK OFFICE
CERTIFICATE OF CORRECTION

PATENT NO. : 12,277,091 B2
APPLICATION NO. : 18/223282
DATED : April 15, 2025
INVENTOR(S) : Le Mouel Page 1 of 1

It is certified that error appears in the above-identified patent and that said Letters Patent is hereby corrected as shown below:

In the Specification

In Column 1, Line 7, delete "under" and insert -- under 35 --, therefor.

In Column 7, Line 54, delete "messages" and insert -- messages. --, therefor.

In the Claims

In Column 25, Line 10, in Claim 1, delete "includes of" and insert -- includes --, therefor.

Signed and Sealed this
Twenty-second Day of July, 2025

Coke Morgan Stewart
*Acting Director of the United States Patent and Trademark Office*